United States Patent
Chou et al.

(10) Patent No.: US 9,342,188 B2
(45) Date of Patent: May 17, 2016

(54) OPTICAL TOUCH CONTROL DEVICE AND COORDINATE DETERMINATION METHOD FOR DETERMINING TOUCH COORDINATE

(71) Applicant: Wistron Corporation, New Taipei (TW)

(72) Inventors: Chia-Te Chou, New Taipei (TW);
Shou-Te Wei, New Taipei (TW);
Shang-Chin Su, New Taipei (TW);
Yu-Yen Chen, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 108 days.

(21) Appl. No.: 13/652,484

(22) Filed: Oct. 16, 2012

(65) Prior Publication Data

US 2013/0249867 A1    Sep. 26, 2013

(30) Foreign Application Priority Data

Mar. 22, 2012 (TW) .............................. 101109844 A

(51) Int. Cl.
*G06F 3/041* (2006.01)
*G06F 3/042* (2006.01)

(52) U.S. Cl.
CPC ............ *G06F 3/0425* (2013.01); *G06F 3/0421* (2013.01); *G06F 2203/04109* (2013.01)

(58) Field of Classification Search
CPC .................................................... G06F 3/0421
USPC ....................................... 345/175; 178/18.09
See application file for complete search history.

(56) References Cited

U.S. PATENT DOCUMENTS

| | | | |
|---|---|---|---|
| 8,669,951 B2 | 3/2014 | Chuang et al. | |
| 2005/0030287 A1* | 2/2005 | Sato | 345/158 |
| 2005/0264541 A1* | 12/2005 | Satoh | 345/173 |
| 2006/0007185 A1* | 1/2006 | Kobayashi | 345/176 |
| 2006/0012579 A1* | 1/2006 | Sato | 345/173 |
| 2006/0187198 A1* | 8/2006 | Lieberman | 345/156 |
| 2006/0232568 A1* | 10/2006 | Tanaka et al. | 345/175 |
| 2006/0232792 A1* | 10/2006 | Kobayashi | 356/621 |
| 2007/0116333 A1* | 5/2007 | Dempski et al. | 382/128 |
| 2008/0062257 A1* | 3/2008 | Corson | 348/169 |
| 2008/0111797 A1* | 5/2008 | Lee | G06F 3/0423 345/175 |
| 2010/0110005 A1* | 5/2010 | Chtchetinine et al. | 345/158 |
| 2010/0201812 A1* | 8/2010 | McGibney et al. | 345/173 |

(Continued)

FOREIGN PATENT DOCUMENTS

TW        201145116 A1    12/2011

OTHER PUBLICATIONS

Office action mailed on Oct. 20, 2014 for the Taiwan application number 101109844, filing date Mar. 22, 2012, p. 1 line 7~14, p. 2~6 and p. 7 line 1~2.

(Continued)

*Primary Examiner* — Adam J Snyder
(74) *Attorney, Agent, or Firm* — Winston Hsu; Scott Margo

(57) ABSTRACT

An optical touch control device includes a touch zone, an optical module, including a light source and a sense module for emitting a light signal to a touch object within the touch zone and obtaining an image data of the touch object via the sense module, and a calculation module coupled to the optical module for determining a touch coordinate of the touch object relative to the touch zone according to a pulse of the image data, wherein the pulse comprises a position parameter and a value parameter.

16 Claims, 10 Drawing Sheets

(56) References Cited

U.S. PATENT DOCUMENTS

| | | | |
|---|---|---|---|
| 2010/0207912 A1* | 8/2010 | Wu et al. ................. | 345/175 |
| 2010/0265215 A1* | 10/2010 | Lai ........................ | 345/175 |
| 2010/0265216 A1* | 10/2010 | Yen et al. ............... | 345/175 |
| 2011/0063253 A1* | 3/2011 | Kiyose .................... | 345/175 |
| 2011/0084924 A1 | 4/2011 | Chang | |
| 2011/0084927 A1 | 4/2011 | Chang | |
| 2011/0193969 A1* | 8/2011 | Tsai et al. ............... | 348/169 |
| 2011/0234542 A1* | 9/2011 | Marson ................... | 345/175 |
| 2011/0266074 A1* | 11/2011 | Fan ........................ | G06F 3/0418 178/18.09 |
| 2011/0279361 A1* | 11/2011 | Onishi .................... | 345/156 |
| 2011/0298753 A1* | 12/2011 | Chuang et al. .......... | 345/175 |
| 2011/0316813 A1* | 12/2011 | Gu et al. ................. | 345/175 |
| 2012/0127129 A1* | 5/2012 | Su et al. ................. | 345/175 |
| 2012/0205166 A1* | 8/2012 | Huang et al. ........... | 178/18.09 |
| 2012/0250936 A1* | 10/2012 | Holmgren ............... | 382/103 |
| 2012/0261548 A1* | 10/2012 | Utukuri et al. .......... | 250/206.1 |

OTHER PUBLICATIONS

Office action mailed on Jul. 29, 2015 for the China application No. 201210103023.6, p. 3 line 4~34, p. 4~5 and p. 6 line 1~17.

\* cited by examiner

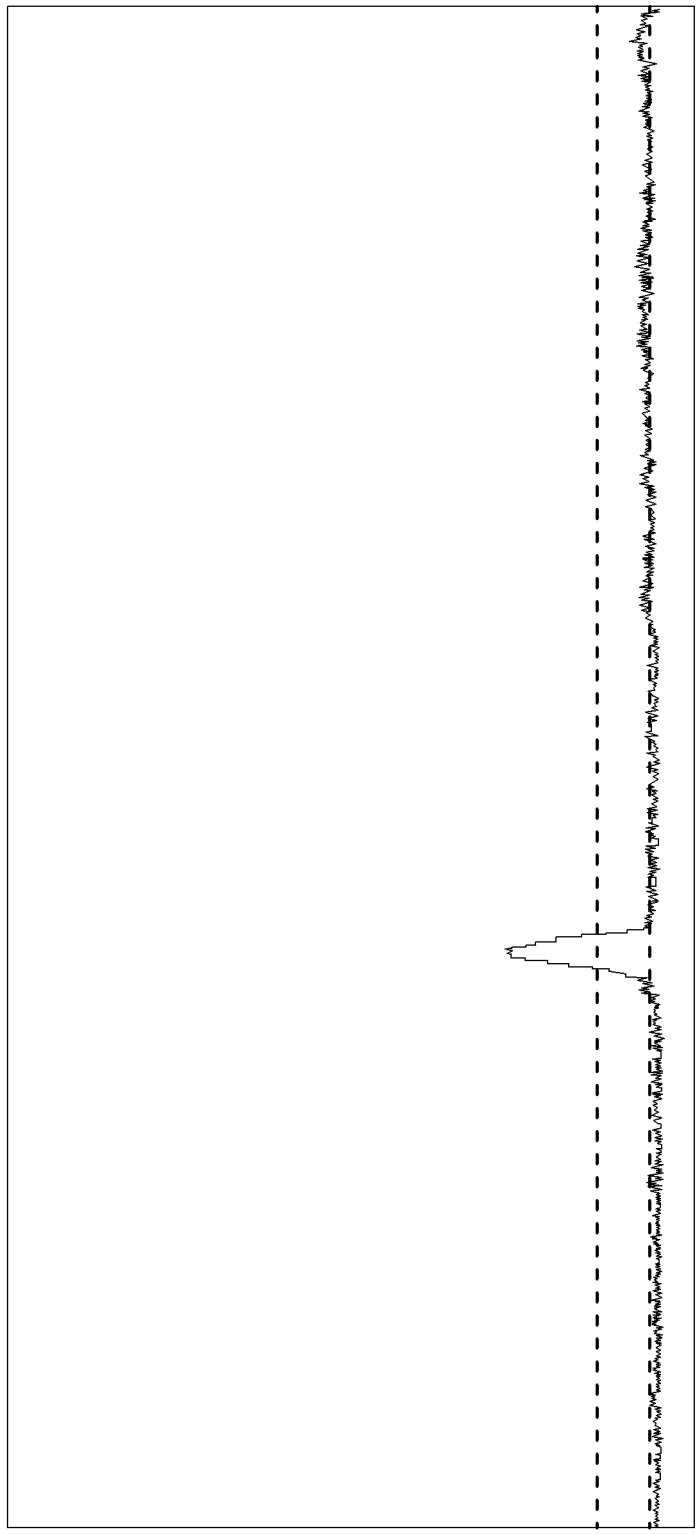

| Short exposure period as 20 ms of light source Resolution as 1920*1080 of display device | | |
|---|---|---|
| Position of finger | Intensities of peak value signal (0,255) | X-axis coordinate of peak value signal (0,640) |
| Starting point (900,10) | 255 | 100 |
| Middle point (960,70) | 255 | 320 |
| Ending point (1020,10) | 255 | 500 |

Medium exposure period as 60 ms of light source
Resolution as 1920*1080 of display device

| Position of finger | Intensities of peak value signal (0,255) | X-axis coordinate of peak value signal (0,640) |
|---|---|---|
| Starting point (760,100) | 150 | 100 |
| Middle point (960,500) | 150 | 320 |
| Ending point (1160,100) | 150 | 500 |

Long exposure period as 100 ms of light source
Resolution as 1920*1080 of display device

| Position of finger | Intensities of peak value signal (0,255) | X-axis coordinate of peak value signal (0,640) |
|---|---|---|
| Starting point (560,300) | 80 | 100 |
| Middle point (960,900) | 80 | 320 |
| Ending point (1360,300) | 80 | 500 |

OPTICAL TOUCH CONTROL DEVICE AND COORDINATE DETERMINATION METHOD FOR DETERMINING TOUCH COORDINATE

BACKGROUND OF THE INVENTION

1. Field of the Invention

The disclosure relates to an optical touch control device and a method for determining a touch coordinate, and more particularly, to an optical touch control device and a method for determining a touch coordinate via utilizing a single optical sense module to obtain an image data.

2. Description of the Prior Art

The touch control device has been widely utilized among electrical products. There are four types of the common touch control device, such as the resistive type, the capacitive type, the surface acoustic wave type and the optics type, and each type of the touch control devices provides different accuracy, so as to be selected for different users' requirements. In the prior art, the optics type touch control device utilizes a plurality of optical sense modules to detect a touch coordinate relative to a touch object.

Please refer to FIG. 1, which illustrates a conventional schematic diagram of an optical touch control device 10. As shown in FIG. 1, the optical touch control device 10 installs a plurality of light source bars 1000, 1002, 1004, 1006 surrounding a touch control panel 104, so as to generate a plurality of light source signals within spatial boundaries of the touch control panel 104. Optical detectors 1020, 1022 are installed along one side of the optical touch control device 10, so as to receive the plurality of light source signals. When a touch object, e.g. a finger F, appears within the spatial boundaries of the touch control panel 104, the finger F may partially block the plurality of light source signals generated by the plurality of light source bars 1000, 1002, 1004, 1006, so as to generate a shadow zone corresponding to the finger F. Under such circumstances, the optical detectors 1020, 1022 obtain a first image data and a second image data containing the shadow zone, respectively. The first image data and the second image data render distances between the finger F and the optical detectors 1020, 1022 according to a signal analysis of the shadow zone. Further, the distances between the finger F and the optical detectors 1020, 1022 are inputted into the triangulation location technique to estimate the position of the finger F relative to the touch control panel 104.

As can be seen from the above, the optical touch control device 10 must utilize the plurality of optical detectors to satisfy the condition of the triangulation location technique, so as to estimate the position of the touch object. On the one hand, the production cost may increase. On the other hand, the plurality of optical detectors must synchronize to obtain the image data, or additional comparison circuits may be installed to process differences of the image data. Therefore, it is an important issue to appropriately reduce the number of the optical detectors as well as to effectively simplify the calculation complexity of the image data.

SUMMARY OF THE INVENTION

It is therefore an objective of the disclosure to provide an optical touch control device and a method for determining a coordinate by utilizing a single optical sense module to obtain an image data.

The disclosure discloses an optical touch control device that includes a touch zone, an optical module, including a light source and a sense module for emitting a light signal to a touch object within the touch zone and obtaining an image data of the touch object via the sense module, and a calculation module coupled to the optical module for determining a touch coordinate of the touch object relative to the touch zone according to a pulse of the image data, wherein the pulse comprises a position parameter and a value parameter.

The disclosure also discloses another method for determining a touch coordinate that includes emitting a light signal to a touch object within a touch zone and obtaining an image data of the touch object; and determining a touch coordinate of the touch object relative to the touch zone according to a pulse of the image data; wherein the pulse comprises a position parameter and an intensity parameter.

These and other objectives of the disclosure will no doubt become obvious to those of ordinary skill in the art after reading the following detailed description of the preferred embodiment that is illustrated in the various figures and drawings.

BRIEF DESCRIPTION OF THE DRAWINGS

FIG. 4A to FIG. 4C illustrate schematic diagrams of different image data sensed by the sense module according to different embodiments of the disclosure.

DETAILED DESCRIPTION

Figure 1:
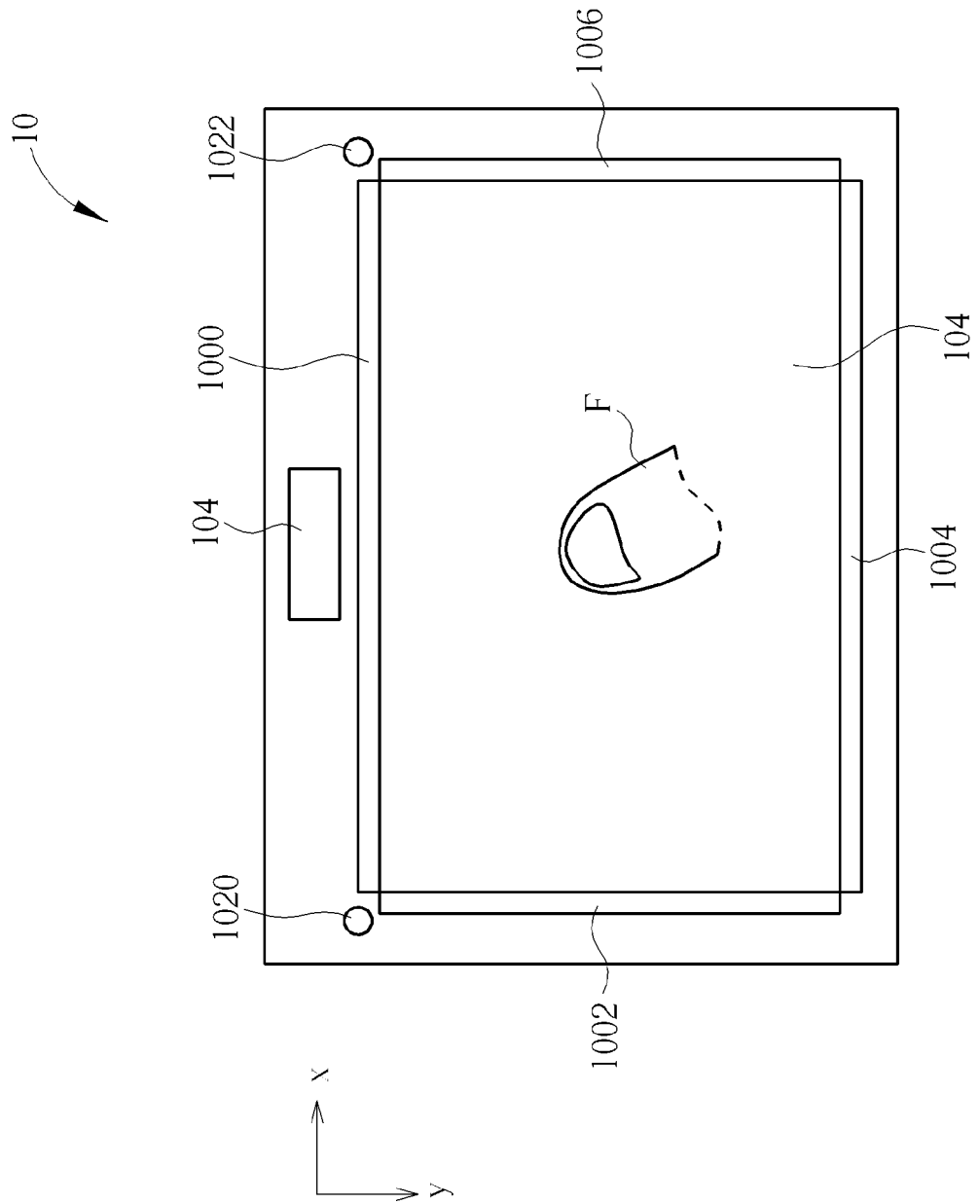
FIG. 1 illustrates a conventional schematic diagram of an optical touch control device.
Figure 2:
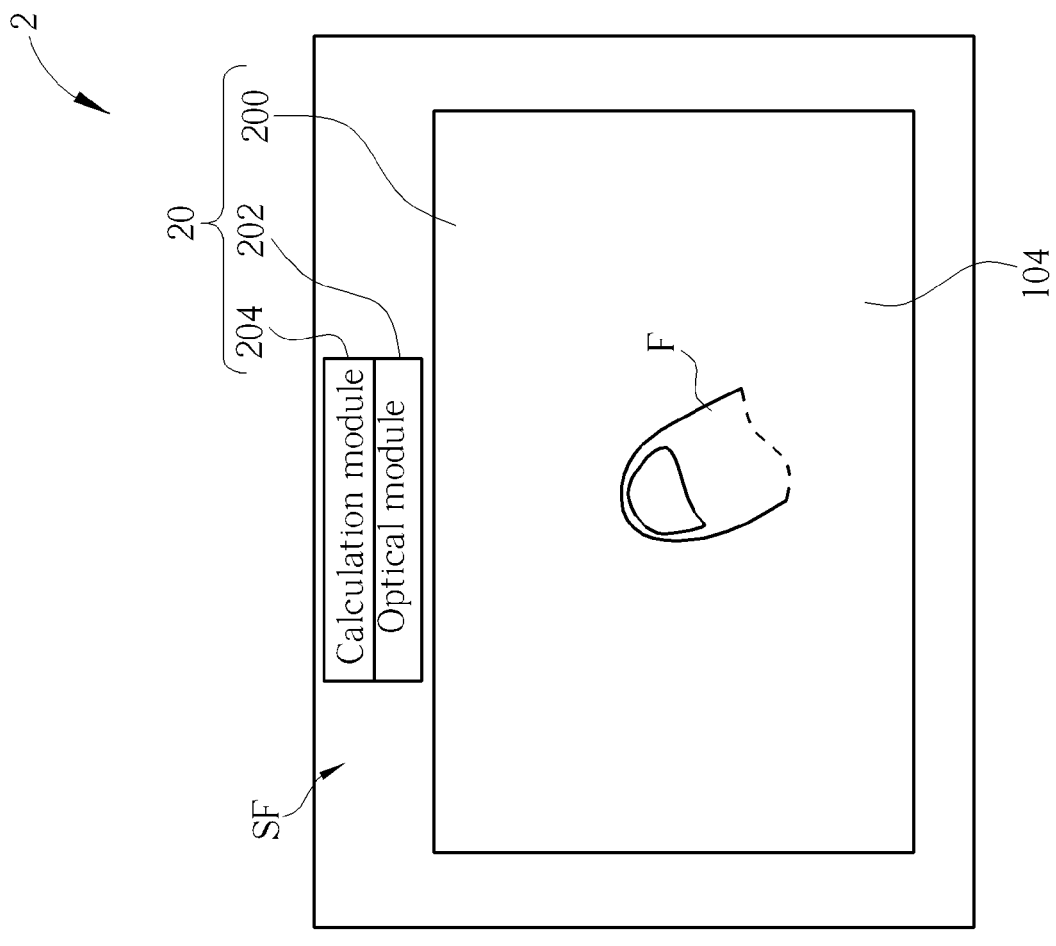
FIG. 2 illustrates an externally schematic diagram of a display device integrated with an optical touch control device according to an embodiment of the disclosure.
Figure 3:
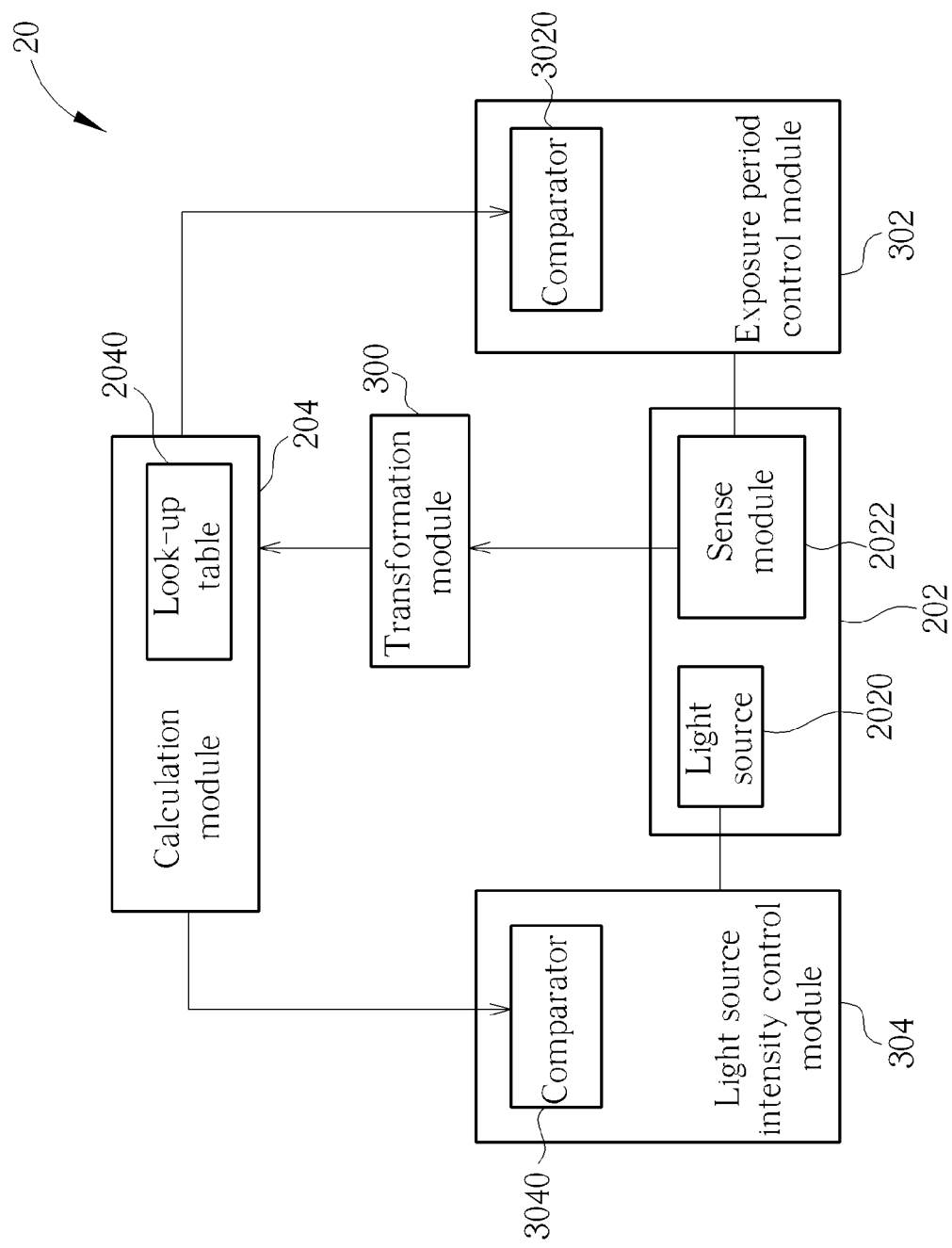
FIG. 3 illustrates a detailed schematic diagram of the optical touch control device according to an embodiment of the disclosure.

Please refer to FIG. 2 and FIG. 3, wherein FIG. 2 illustrates an externally schematic diagram of a display device 2 integrated with an optical touch control device 20 according to an embodiment of the disclosure, and FIG. 3 illustrates a detailed schematic diagram of the optical touch control device 20 according to an embodiment of the disclosure. As shown in FIG. 2 and FIG. 3, the optical touch control device 20 includes a touch zone 200, an optical module 202, a calculation module 204, a transformation module 300, an exposure period control module 302 and a light source intensity control module 304. In this embodiment, the touch zone 200 corresponds to a display zone of the display device 2 and mostly covers the display device 2, so as to provide the user with touch operation. Only partially areas of the display device 2 remain to be a frame SF. The optical module 202 is installed at one side of the frame SF of the display device 2, and is approximately located at a central area of the frame SF. The calculation module 204 is electrically coupled to the optical module 202. In this embodiment, the calculation module 204 and the optical module 202 practically connect to each other. However, according to different users' requirements, the calculation module 204 and the optical module 202 can be separately installed inside the optical touch control device 20, which is not limiting to the scope of the disclosure. All the above elements are only demonstrated hereinafter as an example to fit for the optical touch control device 20, and the optical touch control device 20 can be modified/amended/ changed to have different sizes or linkage of composing elements, so as to satisfy different users' requirements, which is not described hereinafter.

In detail, the optical module 202 includes a light source 2020 and a sense module 2022. The light source 2020 can be formed as a spot/bar light source, a bulb or a light-emitting diode (LED) to emit a light source signal. The light source 2020 is approximately located at the central area of the frame SF, and the light source signal is averagely scattered among spatial boundaries of the touch zone 200. The sense module 2022 is utilized to obtain an image data in the touch zone 200 within a particular period. The image data corresponds to a plurality of lighting spot signals and is demonstrated as a pulse shape to show different intensities among the plurality of lighting spot signals. The plurality of lighting spot signals can be collected by an optical lens or an optics-sensing element. Certainly, other optical elements can also be installed according to different users' requirements, so as to increase collection efficiency of the plurality of lighting spot signals, which is not limiting to the scope of the disclosure.

The transformation module 300 is coupled to the sense module 2022 and the calculation module 204. The transformation module 300 generates a peak value signal according to a position parameter and an intensity parameter of the pulse of the image data, so as to transmit the peak value signal to the calculation module 204. The peak value signal includes the intensity parameter represented by different values of Y-axis coordinates and the position parameter represented by different values of X-axis coordinates. The transformation module 300 can also be integrated inside the sense module 2022, and the sense module 2022 can directly obtain the image data to output the peak value signal, which is not limiting to the scope of the disclosure. Please refer to FIG. 4A to FIG. 4C, which illustrate different schematic diagrams of different image data sensed by the sense module 2022 according to different embodiments of the disclosure. The different image data correspond to different peak value signals, and each of the peak value signals includes different X-axis coordinates as the position parameters as well as different Y-axis coordinates as the intensity parameters and are outputted by the transformation module 300.

The exposure period control module 302 is coupled to the sense module 2022 and the calculation module 204, and includes a comparator 3020. The comparator 3020 utilizes a predetermined upper threshold value and a lower threshold value. By comparing the upper/lower threshold value with the peak value signal outputted by the calculation module 204, the exposure period control module 302 generates a control signal to control an exposure period of the sense module 2022 for obtaining the data image. Through adjustment of the exposure period, intensities of the peak value signal can be adjusted accordingly to make sure the peak value signal is not larger than the upper threshold value or not smaller than the lower threshold value, decreasing difficulties in determining the X-axis coordinate or the Y-axis coordinate of the peak value signal.

The light source intensity control module 304 is coupled to the light source 2020 and the calculation module 204, and includes a comparator 3040. The comparator 3040 utilizes a predetermined upper threshold value and a lower threshold value. By comparing the upper/lower threshold value with the peak value signal outputted by the calculation module 204, the light source intensity control module 304 generates a control signal to control the light source signal generated by the light source 2020. Through adjustment of the light source signal, intensities of the peak value signal can be adjusted accordingly to make sure the peak value signal is not larger than the upper threshold value or not smaller than the lower threshold value, decreasing difficulties in determining the X-axis coordinate or the Y-axis coordinate of the peal value signal.

The calculation module 204 receives the peak value signal outputted from the transformation module 300, and may utilize a look-up table 2040 inside a register device not shown in the figure. The look-up table 2040 makes the X-axis coordinates of the position parameter correspond to X-axis coordinate values of the touch zone 200, and makes the Y-axis coordinates of the intensity parameter correspond to Y-axis coordinate values of the touch zone 200, so as to determine a touch coordinate of the finger F relative to the touch zone 200. Alternatively, the X-axis coordinates of the position parameter as well as the Y-axis coordinates of the intensity parameter can be inputted into a following calculation process to obtain the touch coordinate of the finger F relative to the touch zone 200. Or a transmission interface coupled to a computer can also be utilized to dynamically output the intensity parameter and the position parameter to an algorithm inside the computer for coordinate determination, so as to determine the touch coordinate of the finger F. Since direct utilization of the look-up table 2040 provides a more convenient approach for obtaining the touch coordinate, which leads to realization of the optical touch control device 20 being more portable, the following embodiment of the disclosure is demonstrated with the look-up table 2040, which is not limiting to the scope of the disclosure.

Figure 4A:
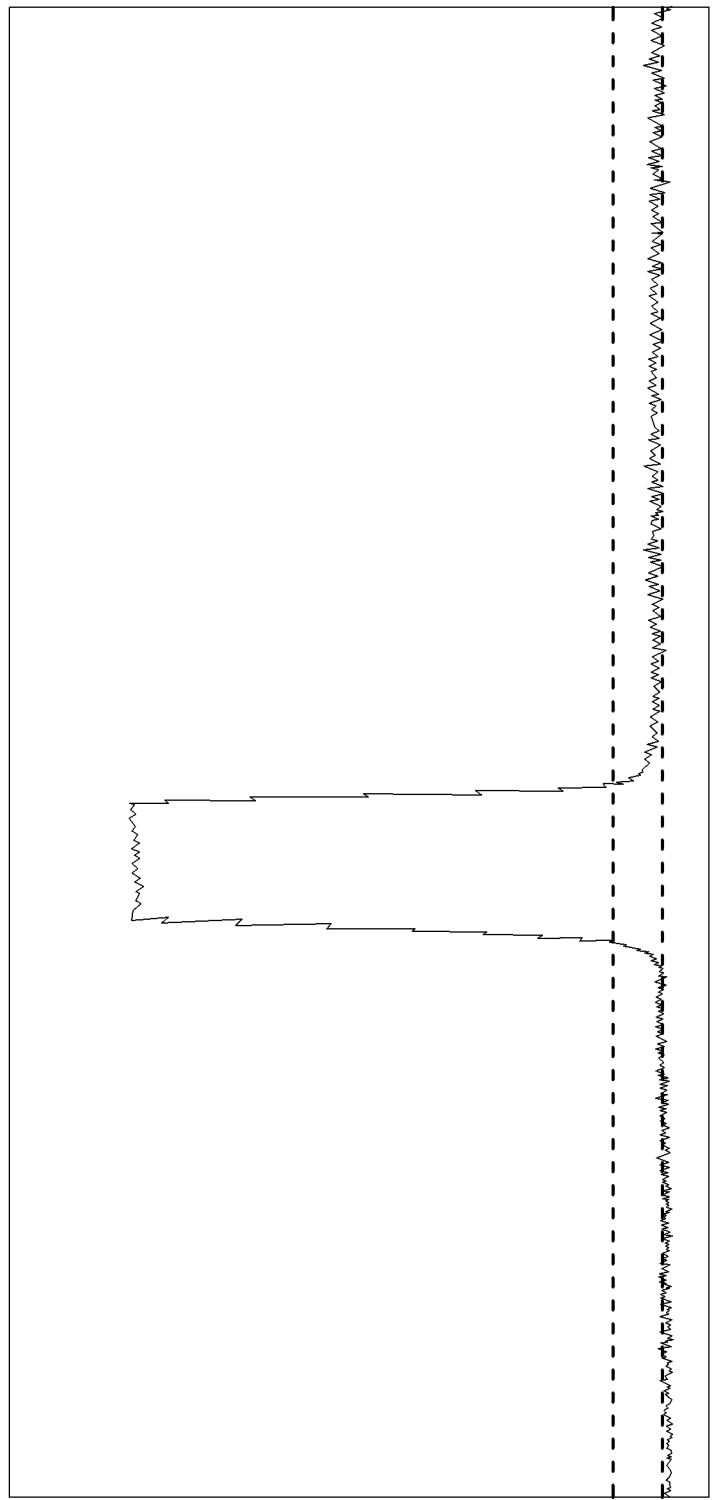

In detail, as shown in FIG. 4A, the transverse axis of the image data renders the X-axis resolution of the sense module 2022, which represents a display range of the touch zone 200 along the X-axis direction, and the vertical axis of the image data represents different intensities of the date image. Accordingly, level changes of the pulse shape represent different intensities of the image data along the X-axis direction. In this embodiment, the peak of the pulse shape surpasses the maximum signal which can be detected by the sense module 2022, and is demonstrated as a cut-off pulse shape as shown in FIG. 4A.

Figure 4B:
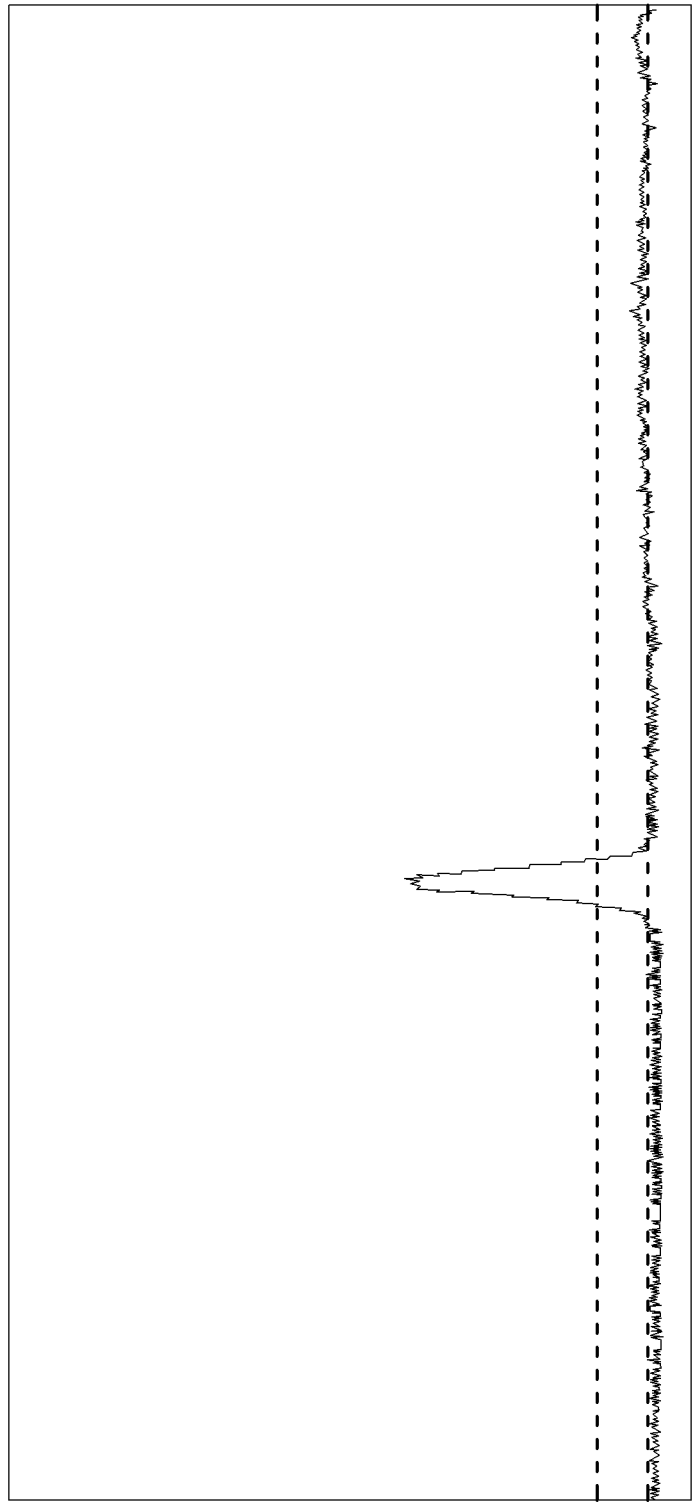

In comparison with FIG. 4A, the peak value signals of the image data shown in FIG. 4B or FIG. 4C have different X-axis/Y-axis coordinates, which means that the finger F touches different spatial areas of the touch zone 200. Accordingly, the light source signal retrieved by the sense module 2022 on the finger F generates different Y-axis coordinates of the peak value signals, and the X-axis coordinates of the peak value signals changes as well. With the same control signal generated by the light source intensity control module 304, distances between the finger F and the sense module 2022 can correspondingly change the Y-axis coordinate of the peak value signal. In other words, when the finger F is close to the sense module 2022, the Y-axis coordinate of the peak value signal is larger; when the finger F is far away from the sense module 2022, the Y-axis coordinate of the peak value signal is smaller. Under such circumstances, the embodiment of the disclosure utilizes the exposure period control module 302 or the light source intensity control module 304 to correspondingly change the exposure period of the sense module 2022 or the intensity of the light source signal of the light source 2020. It provides another approach to change the Y-axis coordinate of the peak value signal and avoiding the peak value signal being too large, as shown in FIG. 4A, or being too small, as shown in FIG. 4C, which can be hardly recognized or recognized with less accuracy of the X-axis coordinate or the Y-axis coordinate.

Lastly, changes of the Y-axis coordinate of the peak value signal and changes of the X-axis coordinate thereof while the finger F has different touch coordinates on the touch zone 200 can be utilized to form the look-up table 2040 along the Y-axis direction and the X-axis direction. Additionally, those skilled in the art can adaptively add related parameters, such as the exposure period and the light source intensity, to increase the accuracy for determining the touch coordinate. Further, other parameters, such as angle changes between the light source and the touch object or sizes of the touch object, can also be taken into consideration to determine the touch coordinate, so as to eliminate errors of the determination of the touch coordinate, which is also the scope of the disclosure.

Figure 5A:
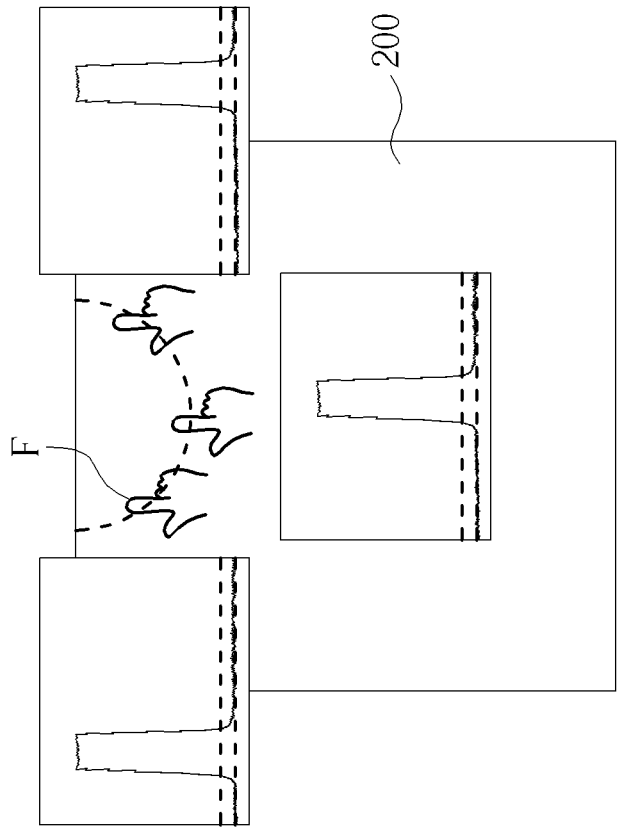
FIG. 5A to FIG. 5C illustrate schematic diagrams of determining the touch coordinate on the optical touch control device according to different embodiments of the disclosure.
Figure 5B:
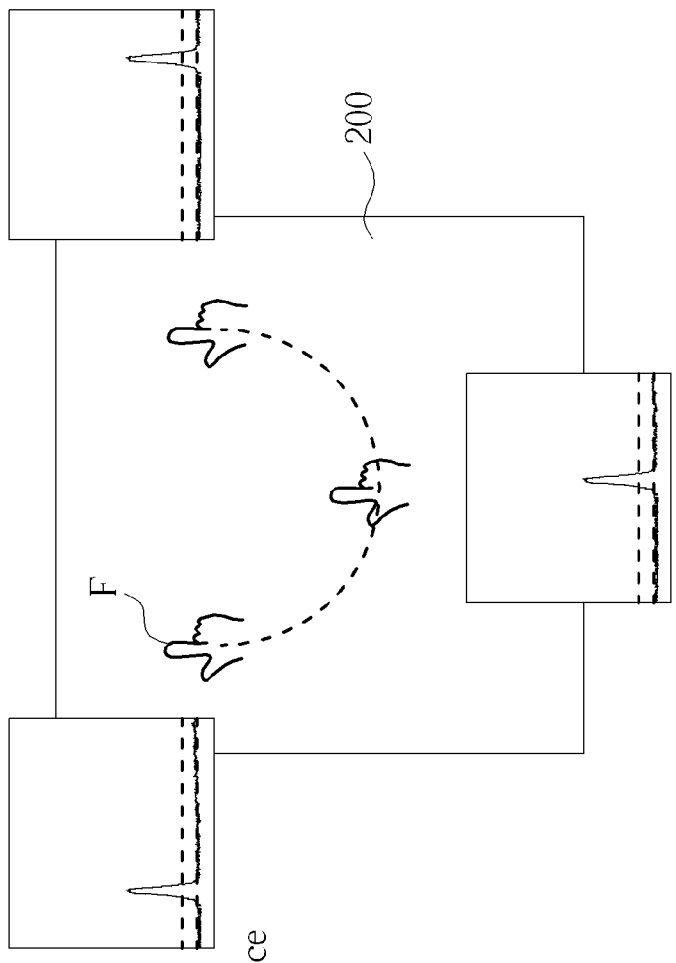
Figure 5C:
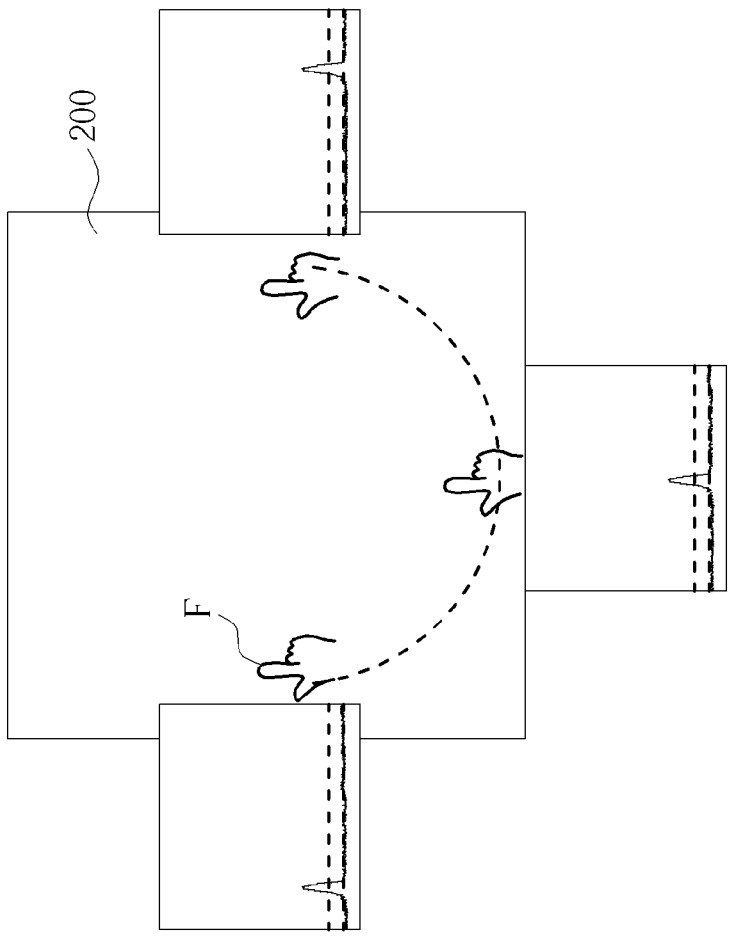

Please refer to FIG. 5A, FIG. 5B and FIG. 5C, which illustrate schematic diagrams of determining the touch coordinate on the optical touch control device 20 according to different embodiments of the disclosure. As can be seen, the sense module 2022 has the optical elements with the transverse axis resolution as (0,640) and the vertical axis resolution as (0,255), and the display device has the pixel resolution as 1920*1080. The finger F moves across the touch zone 200 with a semi-arc, and a picture is taken of the finger F at the starting point, the middle point and the ending point, respectively. Due to different distances between the finger F and the sense module 2022 in different embodiments, the exposure periods are correspondingly predetermined to be 20 ms, 60 ms and 100 ms. In other words, the larger distance is accompanied by the longer exposure period, which prevents the peak value signal from being too small to be recognized for the touch coordinate determination.

As shown in FIG. 5A, the finger F moves from the starting point through the middle point to the ending point, and accordingly, the sense module 2022 detects the Y-axis coordinate of the peak value signal and the X-axis coordinate thereof to be (255,100), (255,320) and (255,500), so as to have the practical touch coordinate as (900,10), (960,70) and (1020,10) via the look-up table. As shown in FIG. 5B, the finger F moves from the starting point through the middle point to the ending point, and accordingly, the sense module 2022 detects the Y-axis coordinate of the peak value signal and the X-axis coordinate thereof to be (150,100), (150,320) and (150,500), so as to have the practical touch coordinate as (760,100), (960,500) and (1160,100) via the look-up table. Lastly, as shown in FIG. 5C, the finger F moves from the starting point through the middle point to the ending point, and accordingly, the sense module 2022 detects the Y-axis coordinate of the peak signal and the X-axis coordinate thereof to be (80,100), (80,320) and (80,500), so as to have the practical touch coordinate as (560,300), (960,900) and (1360, 300) via the look-up table. Therefore, through the single sense module 2022, the optical touch control device 20 has realized the determination of the touch coordinate of the finger F while the finger F touches different positions onto the touch zone 200.

Figure 6:
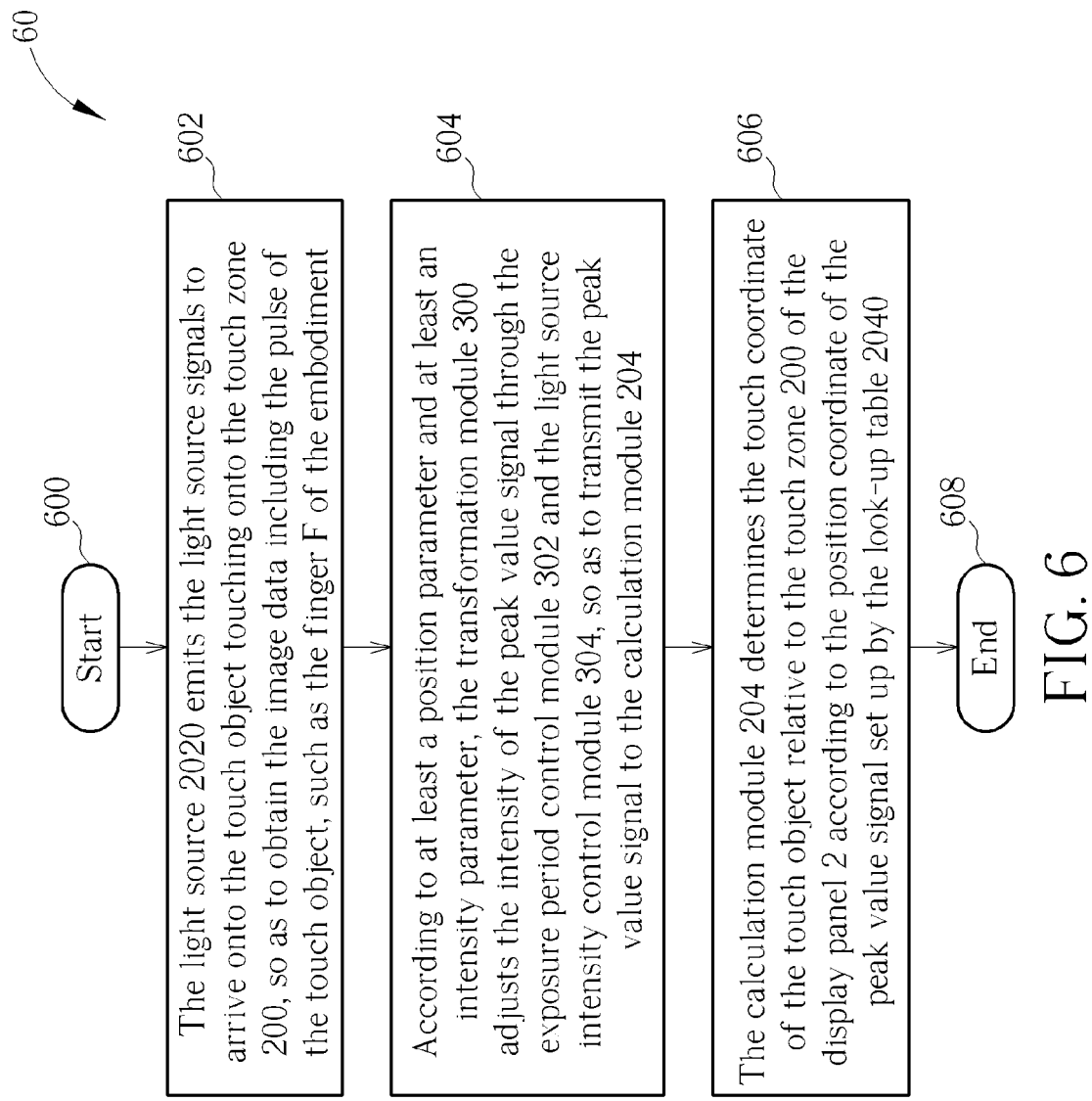
FIG. 6 illustrates a flow chart of a touch coordinate determination process according to an embodiment of the disclosure.

Further, the determination of the touch coordinate for the optical touch control device 20 according to an embodiment of the disclosure can be summarized as a touch coordinate determination process 60, as shown in FIG. 6. The touch coordinate determination process 60 includes the steps as follows:

Step 600: Start.

Step 602: The light source 2020 emits the light source signals to arrive onto the touch object touching onto the touch zone 200, so as to obtain the image data including the pulse of the touch object, such as the finger F of the embodiment.

Step 604: According to at least a position parameter and at least an intensity parameter, the transformation module 300 adjusts the intensity of the peak value signal through the exposure period control module 302 and the light source intensity control module 304, so as to transmit the peak value signal to the calculation module 204.

Step 606: The calculation module 204 determines the touch coordinate of the touch object relative to the touch zone 200 of the display panel 2 according to the position coordinate of the peak value signal set up by the look-up table 2040.

Step 608: End.

The detailed steps of the touch coordinate determination process 60 can be understood via FIG. 2 to FIG. 5C and related paragraphs of the optical touch control device 20, which is not described hereinafter.

Noticeably, the sense module 2022 of the embodiment respectively obtains the image data of the touch object after the light source signals arrive onto the touch object. The transformation module 300 outputs the peak value signals corresponding to the plurality of lighting spots, accordingly. In comparison, the prior art utilizes the plurality of optical detectors 1010, 1022 to obtain the image data including signals of the shadow zone, and to render the distances between the finger F and the optical detectors 1020, 1022, so as to combine the triangulation location technique to obtain the position of the touch object relative to the touch control panel 104. Therefore, those skilled in the art can modify the triangulation location technique as debugging tables or correctional values, so as to combine the triangulation location technique with the embodiment of the disclosure to enhance the determination accuracy of the touch coordinate as well as to adaptively reduce interferences from the surrounding environment, which is also the scope of the disclosure.

In summary, the disclosure provides an optical touch control device which utilizes a light source to emit a plurality of light source signals to arrive onto a touch object while the touch object touches a touch zone. Next, a sense module correspondingly obtains a pulse of an image data of the touch object, and a transformation module transforms the pulse into a peak value signal including at least a position parameter and at least an intensity parameter. Additionally, an exposure period control module and a light source intensity control module are adaptively utilized to adjust intensities of the peak value signal. Lastly, a calculation module compares the peak value signal with a predetermined look-up table to determine a touch coordinate of the touch object, which provides users a more accurate touch coordinate in comparison with the prior art.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. An optical touch control device comprising:
   a touch zone;
   a frame for surrounding the touch zone;
   an optical module, disposed on a central zone of a side of the frame, comprising a single light source and a sense module for emitting a light signal from the single light source to a touch object within the touch zone and obtaining an image data of the touch object via the sense module;
   a transformation module coupled to the sense module for generating a peak value signal according to a pulse of the image data, so as to transmit the peak value signal to a calculation module; and
   the calculation module coupled to the optical module for determining a touch coordinate of the touch object relative to the touch zone according to the peak value signal;

wherein the pulse is obtained via optically accumulating reflected light signals into the optical module and comprises a position parameter and an intensity parameter, a peak waveform of the pulse is reflected by the touch object to correspond to a position of the touch object, and intensities of the peak value signal are varied according to a relative position between the touch object and the sense module.

2. The optical touch control device of claim 1, further comprising an exposure period control module coupled to the sense module for controlling an exposure period of the sense module for obtaining the image data.

3. The optical touch control device of claim 2, wherein the exposure period control module further comprises a comparator predetermined at least a threshold value for adjusting the exposure period according to the peak value signal, so as to adjust intensities of the peak value signal.

4. The optical touch control device of claim 1, further comprising a light source intensity control module coupled to the light source for adjusting intensities of the light signal according to the relative position.

5. The optical touch control device of claim 4, wherein the light source intensity control module further comprises a comparator predetermined at least a threshold value for adjusting the intensities of the light signal according to the peak value signal.

6. The optical touch control device of claim 1, wherein the sense module further comprises at least an optical lens for obtaining the image data when the light signal arrives onto the touch object.

7. The optical touch control device of claim 1, wherein the sense module further comprises at least an optics-sensing element for obtaining the image data when the light signal arrives onto the touch object.

8. The optical touch control device of claim 1, wherein the image data corresponds to a plurality of lighting spot signals.

9. The optical touch control device of claim 1, wherein the touch zone is a display zone of a display panel.

10. The optical touch control device of claim 9, wherein the position parameter and the intensity parameter are utilized for forming a look-up table.

11. The optical touch control device of claim 10, wherein the look-up table is utilized for determining the touch coordinate of the touch object onto the display panel.

12. A method for determining a touch coordinate comprising:
utilizing a single light source of an optical module for emitting a light signal to a touch object within a touch zone, being surrounded by a frame, and obtaining an image data of the touch object, wherein the optical module is disposed on a central zone of a side of the frame;
generating a peak value signal according to a pulse of the image data, so as to transmit the peak value signal to a calculation module; and
determining, via the calculation module, a touch coordinate of the touch object relative to the touch zone according to the peak value signal;
wherein the pulse is obtained via optically accumulating reflected light signals into the optical module and comprises a position parameter and an intensity parameter, a peak waveform of the pulse is reflected by the touch object to correspond to a position of the touch object, and intensities of the peak value signal are varied according to a relative position between the touch object and a sense module.

13. The method of claim 12, further comprising:
controlling an exposure period of the image data to adjust intensities of the peak value signal.

14. The method of claim 12, further comprising lowering the intensities of the light signal when the peak value signal is larger than a threshold value.

15. The method of claim 12, further comprising:
forming a look-up table according to the position parameter and the intensity parameter.

16. The method of claim 12, further comprises:
determining the touch coordinate of the touch object onto a display panel according to the position parameter.

* * * * *